United States Patent
Gupta et al.

(10) Patent No.: US 9,167,412 B2
(45) Date of Patent: Oct. 20, 2015

(54) TECHNIQUES FOR ROAMING BETWEEN WIRELESS LOCAL AREA NETWORKS BELONGING TO A SOCIAL NETWORK

(71) Applicant: Intel Corporation, Santa Clara, CA (US)

(72) Inventors: Vivek Gupta, Milpitas, CA (US); Necati Canpolat, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 63 days.

(21) Appl. No.: 13/902,537

(22) Filed: May 24, 2013

(65) Prior Publication Data

US 2014/0269653 A1    Sep. 18, 2014

Related U.S. Application Data

(60) Provisional application No. 61/789,578, filed on Mar. 15, 2013.

(51) Int. Cl.
| | |
|---|---|
| *H04W 8/08* | (2009.01) |
| *H04W 76/02* | (2009.01) |
| *H04W 48/20* | (2009.01) |
| *H04W 84/12* | (2009.01) |
| *H04W 48/16* | (2009.01) |
| *H04W 8/12* | (2009.01) |
| *H04W 8/18* | (2009.01) |

(52) U.S. Cl.
CPC ............... *H04W 8/08* (2013.01); *H04W 8/186* (2013.01); *H04W 76/02* (2013.01); *H04W 8/12* (2013.01); *H04W 48/16* (2013.01); *H04W 48/20* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,200,112 B2 | 4/2007 | Sundar et al. | |
| 7,263,076 B1* | 8/2007 | Leibovitz et al. | 370/310 |
| 2004/0192295 A1 | 9/2004 | Tsao et al. | |
| 2008/0014928 A1 | 1/2008 | Chen | |
| 2009/0285166 A1* | 11/2009 | Huber et al. | 370/329 |
| 2010/0081461 A1* | 4/2010 | Bothra et al. | 455/466 |
| 2011/0149928 A1 | 6/2011 | Wu et al. | |
| 2012/0023165 A1* | 1/2012 | Li | 709/203 |
| 2012/0046044 A1* | 2/2012 | Jamtgaard et al. | 455/456.1 |
| 2012/0322407 A1* | 12/2012 | Haberman | 455/411 |

OTHER PUBLICATIONS

Wi-Fi Alliance Hotspot 2.0 Technical Task Group, "Wi-Fi Certified Passpoint (Release 1) Deployment Guidelines", Version 1.0, Oct. 2012.*
"Wi-Fi Alliance® Technical Committee Hotspot 2.0 Technical Task Group Hotspot 2.0 (Release 2) Technical Specification Version 2.13", Feb. 5, 2013 Wi-Fi Alliance, 168 pages, author unknown.
"Draft Standard for Information Technology—Telecommunications and information exchange between systems—Local and metropolitan area networks—Specific requirements", IEEE P802.11u/D13.0, Nov. 2010, 218 pages, author unknown.
International Search Report and Written Opinion, Mailed Date: Jul. 22, 2014, Application No. PCT/US2014/020069, Filed Date: Mar. 4, 2014, pp. 16.

* cited by examiner

*Primary Examiner* — Faruk Hamza
*Assistant Examiner* — Cassandra Decker
(74) *Attorney, Agent, or Firm* — Kacvinsky Daisak Bluni PLLC

(57) ABSTRACT

Examples are disclosed for roaming between wireless local area networks (WLANs) belonging to a social network. In some examples, configuration information for a WLAN may be received for setting up the WLAN for a social network. The social network may have one or more roaming members. Information about the roaming members and one or more policies for the roaming members to connect to the WLAN may also be received. For these examples, the configuration information, roaming member information and the one or more policies may be maintained at a server for a service provider related to the WLAN. Other examples are described and claimed.

30 Claims, 11 Drawing Sheets

Social Network Information 200

| Social Network ID for Social NW 105 | | AP 124  (SSID/HESSID) | |
|---|---|---|---|
| ROAMING PARTNERS | | | |
| Connection Point | Friendly Name | AP Identifier | |
| WLAN 120 | Jones Residence | 124 (SSID/HESSID) | |
| WLAN 130 | Smith House | 134 (SSID/HESSID) | |
| WLAN 140 | Dundee Library | 144 (SSID/HESSID) | |
| WLAN 150 | Red Hills Coffee | 154 (SSID/HESSID) | |
| ... | ... | ... | |
| ROAMING CONSORTIUM | | | |
| User ID | Prompt Owner | Prompt User | Time Duration |
| Jones – 122 | No | No | N/A |
| Smith – 132 | No | No | N/A |
| Library member – 142 | Yes | Yes | 1 Day |
| Red Hills Coffee Customer - 152 | Yes | Yes | 1 Hour |
| Crawford – 222 | Yes | Yes | 1 Hour |
| Townsend - 232 | Yes | Yes | 1 Hour |
| Rierson - 242 | Yes | Yes | 1 Hour |
| ... | ... | ... | ... |

*FIG. 2*

Storage Medium 700

*Computer Executable Instructions for 600*

*FIG. 7*

Storage Medium 1000

Computer Executable
Instructions for 900

*FIG. 10*

TECHNIQUES FOR ROAMING BETWEEN WIRELESS LOCAL AREA NETWORKS BELONGING TO A SOCIAL NETWORK

RELATED CASE

This application claims priority to U.S. Provisional Patent Application No. 61/789,578, filed on Mar. 15, 2013.

TECHNICAL FIELD

Examples described herein are generally related to a mobile device roaming between wireless local access networks.

BACKGROUND

In recent years broadband wireless networks to include both wireless wide area networks (WWANs) or wireless local area networks (WLANs) have seen an explosion in the amount of data traffic associated with mobile devices or user equipment (UEs) accessing these networks. Cellular-based WWANs associated with one or more third generation (3G) or fourth generation (4G) wireless standards promulgated by organizations or standards bodies such as the 3$^{rd}$ Generation Partnership Project (3GPP) have become common. Also, UEs coupling to either 3G 3GPP and/or 4G 3GPP wireless networks are now often enabled with a dual mode capability to not only couple to a cellular-based WWAN but may also to a WLAN using wireless technologies such as Wi-Fi™.

Wi-Fi infrastructure and agreements between service providers for WWANs and/or WLAN are expanding to accommodate roaming of mobile devices. Mobile device roaming may occur not only between WWANs operated by different service providers but also between WWANs and WLANs operated by different service providers or even WLANs operated by different service providers. Industry organizations such as the Wi-Fi Alliance® (WFA) have developed industry standards and/or technical specifications to facilitate roaming of mobile devices and use of Wi-Fi infrastructure.

BRIEF DESCRIPTION OF THE DRAWINGS

FIG. 2 illustrates example social network information.
FIG. 7 illustrates an example of a first storage medium.
FIG. 10 illustrates an example of a second storage medium.

DETAILED DESCRIPTION

Figure 1:
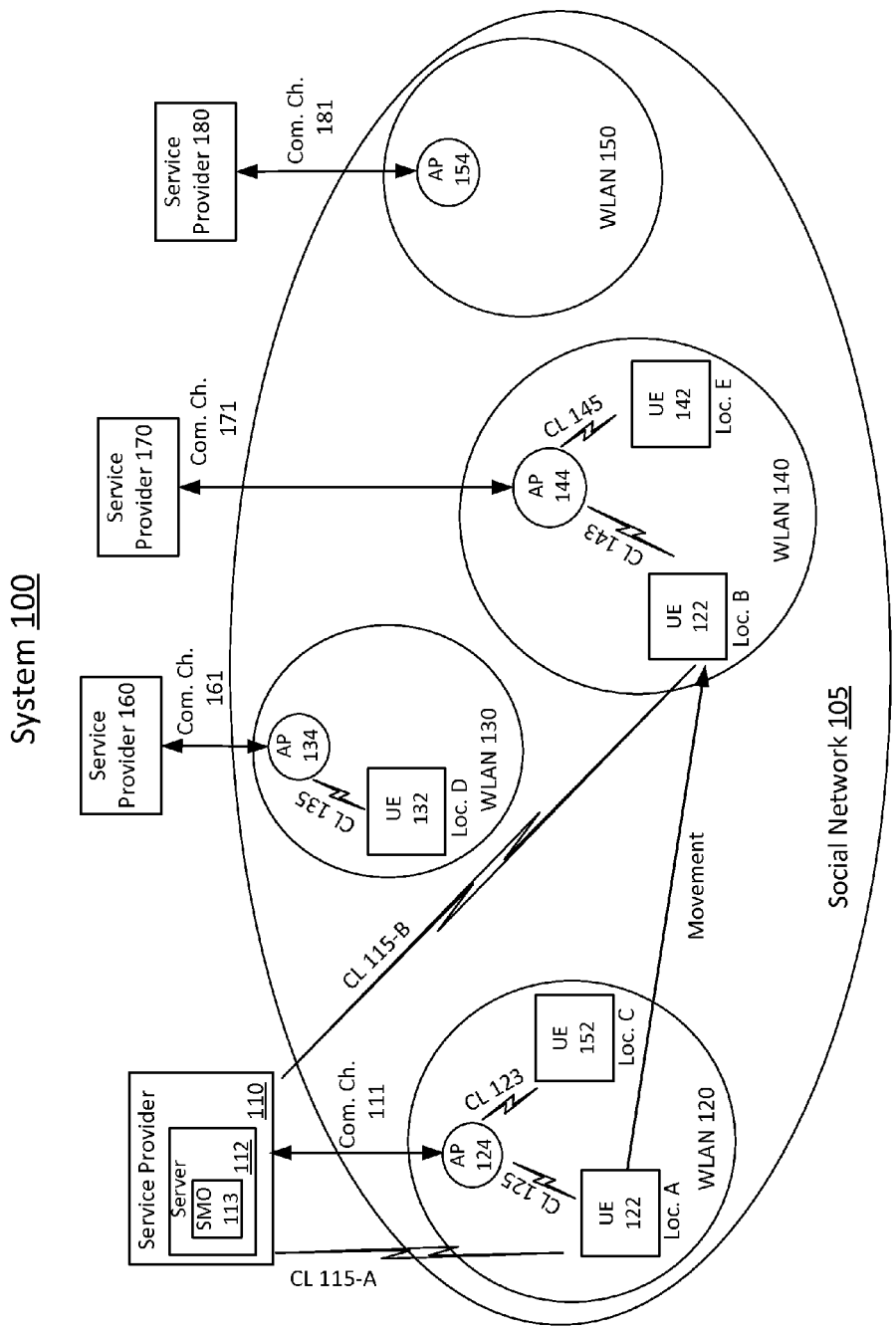
FIG. 1 illustrates an example of a system.

Examples are generally directed to improvements for roaming access for mobile devices or user equipment (UE) to wireless local area networks (WLANs) operated as Wi-Fi hotspots. These wireless technologies may include technologies suitable for use with mobile devices or UEs capable of coupling to Wi-Fi access networks potentially operated by different service providers and/or belonging to different owners. As contemplated by this disclosure, industry organizations such as the Wi-Fi Alliance have developed industry standards and/or specifications to facilitate roaming access of WLANs operated as Wi-Fi hotspots. Standard for operating the WLANs may include standards promulgated by the Institute of Electrical Engineers (IEEE). These WLAN standards may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). Also standards associated with roaming between WLANs or between a wireless wide area network (WWAN) and a WLAN may include such IEEE 802.11 standards as IEEE 802.11u™-2011, Amendment 9: Interworking with External Networks, published February 2011, and/or later version of this standard ("IEEE 802.11u"). Also specifications published by WFA such as the WFA Hotspot 2.0 (Release 1) Technical Specification, version 1.0.0, published June 2012, and/or later versions of this specification ("WFA Hotspot 2.0") may also be associated with mobile devices or UEs roaming between WLANs or between a WAN and a WLAN.

The different service providers may also implement wireless mobile broadband technologies that may include any wireless technologies suitable for use with mobile devices or UEs, such as one or more 3G or 4G wireless standards, revisions, progeny and variants. Examples of wireless mobile broadband technologies may include without limitation any of the Institute of Electrical and Electronics Engineers (IEEE) 802.16m and 802.16p standards, 3GPP Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP before Release 8 ("3G 3GPP") or Release 8 and above ("4G 3GPP") of LTE/System Architecture Evolution (SAE), and so forth. The examples are not limited in this context.

WFA Hotspot 2.0 introduces ways for a roaming mobile device or UE to have as seamless as possible roaming experience between WANs and WLANs or between WLANs. Various collaborative efforts between business operators such as nationally operated restaurant chains or coffee shops have provided some opportunities for roaming. For example, an operator of a UE or mobile device may have a subscriber agreement with a service provider. The service provider may then have an agreement with business operators to allow the UE to seamlessly connect to their WLANs when the UE is within the proximity of one of the business operators' WLANs.

Agreements with nationally operated businesses may work well when a user is located in a business district having a high density of businesses that have agreements with the user's service provider for seamless roaming. These agreements may cover potentially tens of thousands of potential Wi-Fi hotspots or WLANs. A potential of millions of Wi-Fi hotspots may be provided if other types of agreements may be made to allow the UE to connect to WLANs for individual residences, small businesses or even some public places such as a local library or school. However, an efficient and secure way to enter into connection agreements for these millions of potential Wi-Fi hotspots may be problematic. It is with respect to these and other challenges that the examples described herein are needed.

According to some examples, a first method may be implemented at a server for a service provider of a WAN. For these examples, configuration information may be received for configuring a first WLAN for a subscriber as a first connection point for a social network including one or more roaming members. Roaming member information to identify the one or more roaming members may also be received. One or more policies for the one or more roaming members to connect to the first WLAN may also be received. The configuration information, the roaming member information and the one or more policies may then be maintained at the server as part of setting up the first WLAN for the social network.

In some other examples, a second method may be implemented at a UE. For these other examples, configuration information to configure a first WLAN as a first connection point for a social network including one or more roaming members may be received. The configuration information may include a friendly name for the first WLAN and an identifier for one or more access points for connecting to the first WLAN. The configuration information may then be sent to a service provider of a WAN via which the UE may be capable of connecting to according to a subscriber agreement. Also, for these examples, roaming member information may be received to identify the one or more roaming members included in the social network and the roaming member information may also be sent to the service provider. Also, for these examples, indications of one or more policies for the one or more roaming members to connect to the first WLAN may be received and the one or more policies may also be sent to the service provider in order to setup the first WLAN for the social network.

FIG. 1 illustrates an example system 100. In some examples, as shown in FIG. 1, system 100 includes service providers 110, 160, 170 and 180 coupled to WLANs 120, 130, 140 and 150 via communication channels (Com. Ch.) 111, 161, 171 and 181, respectively. Also, as shown in FIG. 1, WLANs 120, 130, 140 include access points (APs) 124, 134, 144 and 154, respectively.

In some examples, as shown in FIG. 1, UEs may be located in various locations that may be within an area of coverage of a given WLAN. For example, UE 122 at location (Loc.) A and UE 152 at Loc. B may be in the area of coverage for WLAN 120 and may communicatively couple to AP 124 via wireless communication links (CLs) 125 and 123, respectively. UE 132 at Loc. D may be in the area of coverage of WLAN 130 and communicatively coupled to AP 134 via wireless CL 135. UE 142 at Loc. E may be in the area of coverage for WLAN 140 and communicatively coupled to AP 144 via wireless CL 145.

According to some examples, some UEs such as UE 122 may have movement that takes that UE out of an area of coverage of one WLAN and into an area of coverage of another WLAN. For these examples, as shown in FIG. 1, UE 122 may move to Loc. B and may then be in the area of coverage of WLAN 140. As described more below, a social network such as social network 105 may have been set up that may allow UE 122 to roam to Loc. B and have an ability to connect to WLAN 140 via wireless CL 143 to AP 144. Also, UE 152 may have originally been located at a location in the coverage area of WLAN 150 but may have roamed to the coverage area of WLAN 120.

In some examples, service provider 110 may be a service provider for a WAN accessible to UE 122. For these examples, an owner/operator of UE 122 and WLAN 120 may be a subscriber to service provider 110. As a subscriber, the owner/operator may have a subscriber agreement with service provider 110 for access to the WAN. That subscriber agreement may be maintained as a subscription management object (SMO) 113 at server 112 for service provider 110.

As shown in FIG. 1, UE 122 may communicatively couple to service provider 110 at Loc. A via either wireless CL 125 that couples to AP 124 and then to service provider 110 via Com. Ch. 111 or more directly via a wireless CL 115-A. UE 122, due to cost limitations (e.g., expensive data plans) or a desire for a connection having more capacity or bandwidth, may desire to connect to service provider 112's WAN through a connection routed through WLAN 120 via wireless CL 125 rather than connect to service provider 110's WAN via a possibly more costly and slower wireless CL 115-A.

Also as shown in FIG. 1, following movement to Loc. B, UE 122 may have an option to couple to service provider 110's WAN via wireless CL 115-B. However, UE 122, due to the same cost limitations and/or a desire for a connection having more capacity or bandwidth, may desire to connect to WLAN 140 via wireless CL 143 rather than connect to service provider 110's WAN via wireless CL 115-B. Also, service provider 110 may desire to reduce burdens on its WAN and/or its wireless/cellular infrastructure and may desire to offload data intensive uses to other WANs operated by other service providers such as service provider 160.

As described more below, logic and/or features at a server for a service provider such as server 110, may receive configuration information for configuring a WLAN such as WLAN 120 for a subscriber such as the owner/operator of UE 122 as a first connection point for a social network such as social network 105. For these examples, one or more roaming members such as UEs 132, 142 or 152 may be part of social network 105. Also, their respective WLANs may serve as connections points or roaming partners for social network 105. Server 110 may also receive information related to these roaming members as well as one or more policies for these roaming members to connect to WLAN 120. Also, the logic and/or features may maintain the configuration information, the roaming member/partner information and the one or more policies at SMO 113 to complete the set up process for WLAN 120 for social network 105.

Also, as described more below, logic and/or features at a UE such as UE 122 may be capable of receiving configuration information to configure WLAN 120 as the first connection point for social network 105 that includes roaming members such as UEs 132, 142 or 152. For these examples, the configuration information may include a friendly name given to WLAN 120 by the owner/operator (e.g., "Jones Residence") and an identifier for one or more access points for connecting to the WLAN 120. The configuration information may then be sent to service provider 110. UE 122 may also receive roaming member information to identify UEs 132, 142 or 152 and then send this roaming partner information to service provider 110. UE 112 may then receive indications (e.g., from a user/owner) of one or more policies for the one or more roaming members to connect to WLAN 120. The logic and/or features of UE 122 may cause these policies to be sent to service provider 110 to complete the set up process for WLAN 120 for social network 105. As mentioned previously, server 112 may include logic and/or features to receive the various pieces of information to set up WLAN 120 and maintain the information in SMO 113.

In some examples, roaming partner information for WLANs 130, 140 and 150 may have been gathered by logic and/or features at a server 112 and/or at UE 122 to add these WLANs as additional connection points for social network 105. As describe more below, the roaming partner information may be gathered in a number of ways to either expand or contract the size of social network 105 in terms of the number of roaming partners and/or WLAN connection points participating in social network 105.

According to some examples, a UE such as UE 122, 132, 142 or 152 may include, but is not limited to, a computer, a personal computer (PC), a desktop computer, a laptop computer, a notebook computer, a netbook computer, a tablet computer, an ultra-book computer, a smart phone, a smart camera, embedded electronics, a gaming console, a portable media device, a portable gaming device, a work station, a mini-computer, a network appliance or a web appliance.

Although not shown in FIG. 1, in some examples a given UE may serve a dual role as both a UE and an access point for a WLAN. For these examples, the UE may be both a roaming member and a roaming partner for social network 105. For example, UE 122 may enable other UEs to tether to UE 122 (e.g., via Bluetooth™ or an IEEE 802.11ad wireless dock) and possibly use UE 122's connection to service provider 110 via wireless CL 115-A or 115-B as a possible WLAN connection point for social network 105.

In some examples, the elements of system 100 shown in FIG. 1 may operate in compliance with at least one or more wireless communication standards or specifications associated with IEEE 802.11 to include IEEE 802.11u or associated with WFA Hotspot 2.0. This disclosure is not limited to these one or more wireless communication standards or specifications.

FIG. 2 illustrates example social network information 200. In some examples, as shown in FIG. 2, social network information 200 includes information related to the WLANs and UEs described for FIG. 1 and system 100 from the perspective of an operator/owner of WLAN 120 and/or UE 122. For these examples, social network 105 from system 100 may have been initiated or started by the user/owner of UE 122 and WLAN 120. Since this owner started social network 105, in some examples, an identifier for the access point of WLAN 120 may be used or adopted as a social network identification (ID) for social network 105. The identifier may be a service set identification (SSID) for AP 124. Alternatively, although not shown in FIG. 1, AP 124 may be part of an extended service set (ESS) having a homogeneous ESS ID (HESSID) identifier and the HESSID may be the social network ID. This disclosure is not limited to either identification scheme for identifying a social network.

According to some examples, roaming partner information may also be included as part of social network information 200. For these examples, each connection point/roaming partner for social network 100 may have a friendly name and an AP identifier. The AP identifier may be either an SSID or a HESSID. The friendly name may enable roaming members to more easily recognize the owner/operator of a given WLAN. For example, as shown in FIG. 2, the connection point for WLAN 140 has a friendly name of "Dundee Library" that may indicate to an operator/owner of a roaming member UE that they are in the proximity of a hotspot owned/operated by the Dundee Library roaming partner.

In some examples, the friendly name for a WLAN may be displayed or presented (e.g., via the UE's display) to the user when in the proximity of the given WLAN. For example, as shown in FIG. 1, when UE 152 came within the proximity of WLAN 120, the user/owner of UE 152 may be prompted with an indication of "Jones Residence". The user/owner of UE 152 may then be asked to use WLAN 120 as a connection point for social network 105.

According to some examples, in addition to roaming partner information, a list of members of a roaming consortium may be included in social network information 200. This list of roaming members may include UEs belonging to owner/operators of roaming partners included in social network information 200 such as UEs 122, 132, 142 and 152 for WLANs 120, 130, 142, 152, respectively. The list of members may also include other UEs that may not have roaming partner WLANs as part of social network 105 but may have an ability to still connect to WLANs included in social network 105. For example, Crawford—222, Townsend—232 and Rierson—242 may be user identifiers for these types of UEs not currently having WLANs as part of social network 105.

According to some examples, either roaming partner information or roaming consortium listed members may have originated from various lists belonging to the owner/operator of UE 122 and/or WLAN 120. These lists may include, but are not limited to, one or more of a contact list, a friend list, a follower list, a customer list, a vendor list, a club list, a family member list, a professional association list, an employee list, a school list. Each of these lists may include e-mail, phone numbers, mailing addresses or other types of identification information. The friend list and follower list may be from Internet-based social applications such as Facebook® or Twitter®.

In some examples, either roaming partner information or roaming consortium listed members may have originated in response to a request made from a UE. For example, Crawford—222 may represent a UE that was in the proximity of WLAN 120 and placed a request to connect to WLAN 120 for social network 105. For this example, the request may have been granted and Crawford—222 was added to the list of roaming consortium members.

According to some examples, one or more policies may be indicated by the operator/owner of WLAN 120 for roaming members listed under the roaming consortium. These policies may include a policy to prompt the operator/owner of WLAN 120 when a given roaming member requests to connect to WLAN. The operator/owner of WLAN 120 may then either grant or deny the request to connect. The policies may also include whether to prompt the user of the UE. The user may then have an option to connect or not to WLAN 120. The policies may also include a connection time duration.

In some examples, the same policies may be set for all roaming members or policies may be tailored to individual or sub-groups of roaming members. For example, as shown in FIG. 2, requests to connect by Jones—122 or Smith—132 does not require a prompt to either the owner or user and has a connection has no time duration limit. For this example, Jones—122 or Smith—132 may be able to auto-connect to WLAN 120 whenever these roaming members come with the coverage area of WLAN 120. All the other members may have policy limitations requiring either a prompt of the owner or user or may have time duration limits.

According to some examples, the policies may also include a prompting of the owner/operator of WLAN 120 whenever a potentially new roaming member places a request to connect to WLAN 120.

Figure 3:
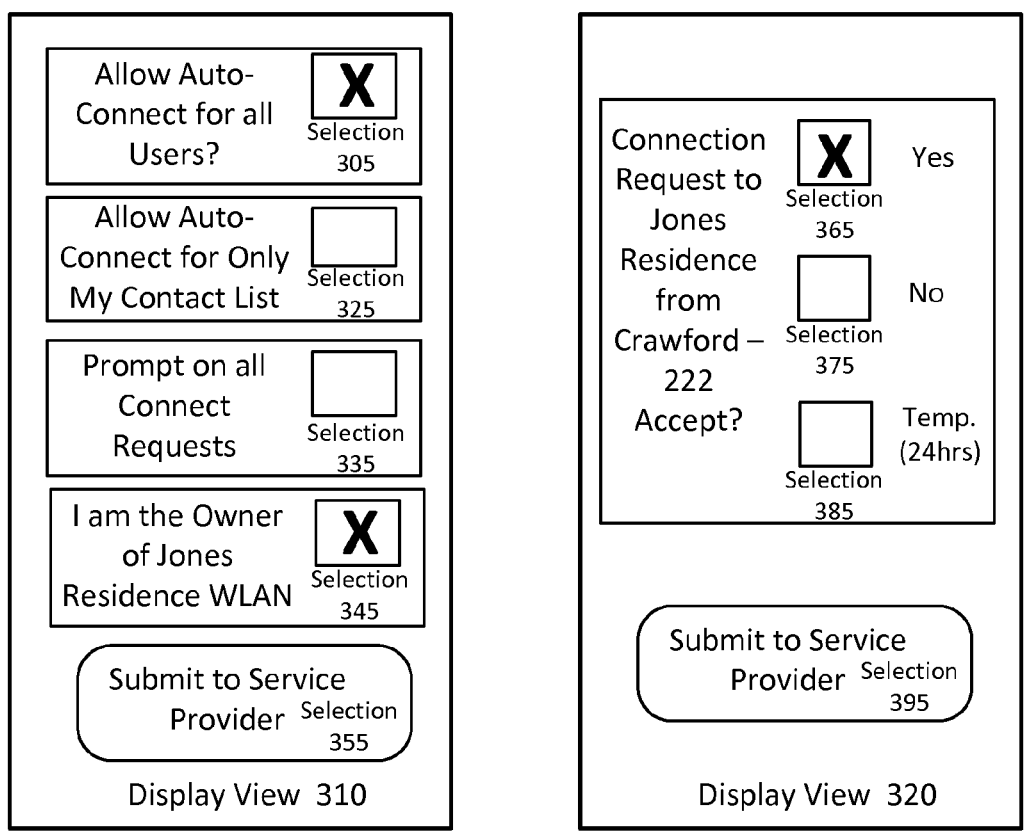
FIG. 3 illustrates example display views to set up a WLAN for a social network.

FIG. 3 illustrates example display views to set up a WLAN for a social network. In some examples, as shown in FIG. 3, the display views include display views 310 and 320. For these examples, display views 310 and 320 may be views presented to an owner/operator or subscriber to set up a WLAN as a connection point for a social network that may include one or more roaming members and/or partners. For example, the subscriber may indicate one or more policies via selections 305, 325 or 335 and then submit these policies to the service provider via selection of 345 and/or 355 as shown for display view 310. Also, additional policies may be indicated via selections 365, 375, 395 when a roaming member requests to connect to the WLAN as shown for display view 320.

In some examples, display views 310 and 320 may be presented to an operator/owner of WLAN 120 or UE 122 and based on the selections, information may be added to or updated to social network information 200. For example, a large "X" in selection 305 (allow auto-connect to all users) may cause an update to policies indicated in social network information 200 to not require prompts to the owner or to the user for the roaming member listed. Also, the lack of a large "X" in selection 385 may also cause an update to policies for Crawford—222 that may eliminate time duration limits for Crawford—222 to connect to WLAN 120.

Figure 4:
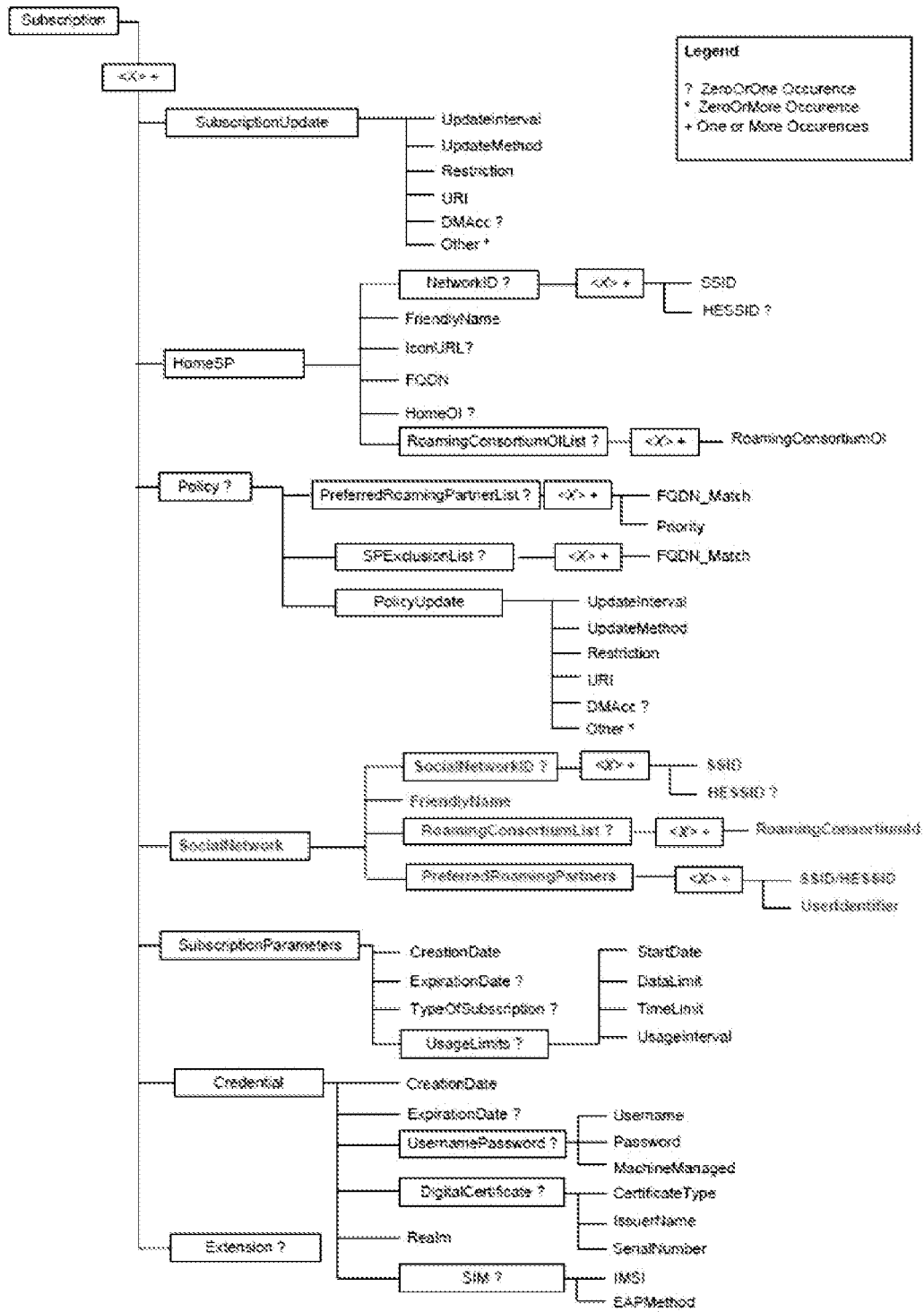
FIG. 4 illustrates an example subscription management object.

FIG. 4 illustrates an example subscription management object 400. As shown in FIG. 4, in some examples, subscription management object 400 may include subscriber information. For these examples, the subscription information may belong to a subscriber to a service provider that maintains the subscriber information in the indicated fields of subscription management object 400. According to some examples, the "SocialNetwork" block of subscription management object 400 may be added subscriber information to a subscriber management object maintain in compliance with WFA Hotspot 2.0.

In some examples, logic and/or features of server 112 for service provide 110 may be capable of maintaining at least some of the information described above for social network information 200 in a format similar to subscription management object 400 at SMO 113. This disclosure is not limited to subscription management object 400 and this example management object is presented as just one example of how configuration information, roaming member information, roaming partner information and one or more policies may be maintained at a server for a service provider.

Figure 5:
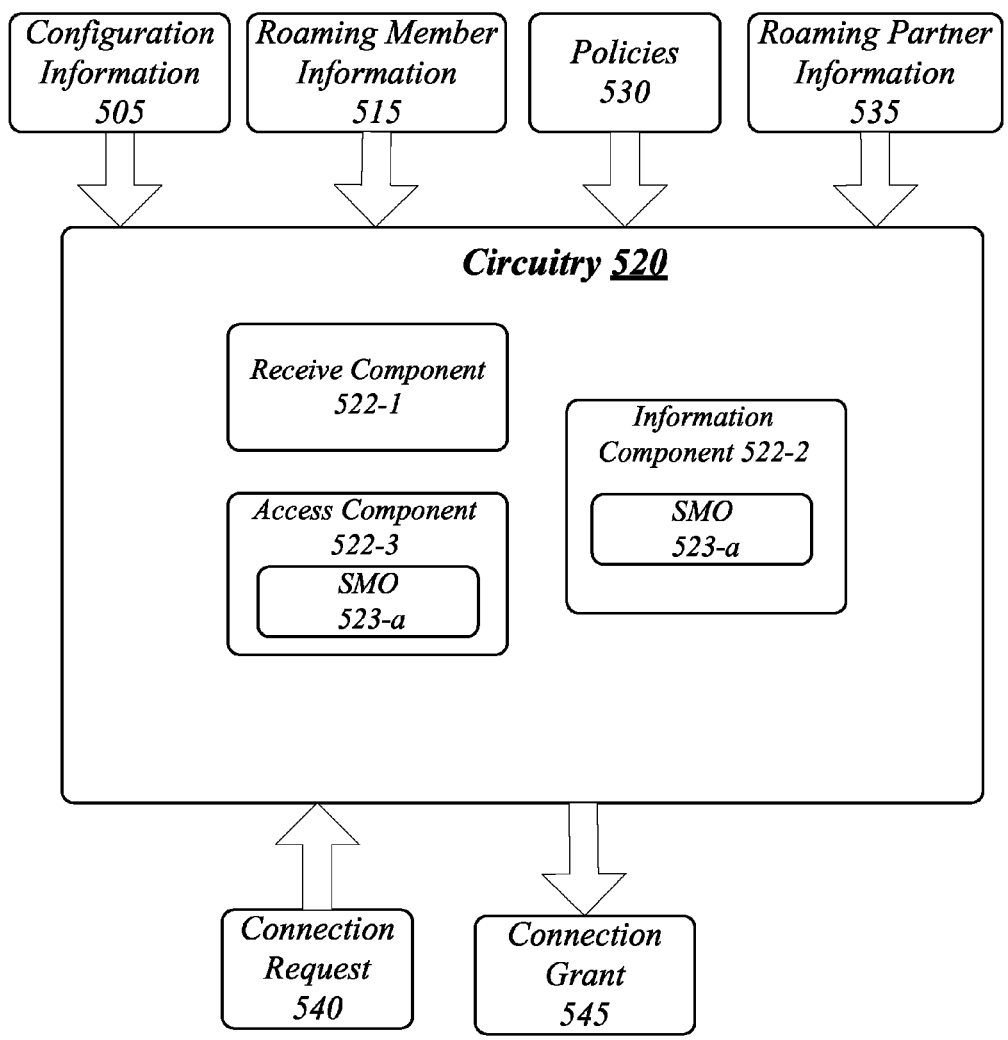
FIG. 5 illustrates an example block diagram for a first apparatus.

FIG. 5 illustrates a block diagram for a first apparatus. As shown in FIG. 5, the first apparatus includes an apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may include a computer and/or firmware implemented apparatus 500 having circuitry 520 arranged to execute one or more components 522-*a*. It is worthy to note that "a" and "b" and "c" and similar designators as used herein are intended to be variables representing any positive integer. Thus, for example, if an implementation sets a value for a=3, then a complete set of components 522-*a* may include modules 522-1, 522-2 or 522-3. The examples are not limited in this context.

According to some examples, apparatus may be part of a server for a service provider of a WAN to include a WWAN that may be capable of operating in compliance with one or more wireless technologies such as those described in or associated with the IEEE 802.11 standards. For example, the server having apparatus 500 may be arranged or configured to wirelessly couple to a UE and/or an wirelessly couple to an access point for a WLAN operated in compliance with IEEE 802.11 standards including IEEE 802.11u and/or specifications such as WFA Hotspot 2.0. The examples are not limited in this context.

In some examples, as shown in FIG. 5, apparatus 500 includes circuitry 520. Circuitry 520 may be generally arranged to execute one or more components 522-*a*. Circuitry 520 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 520. According to some examples circuitry 520 may also be an application specific integrated circuit (ASIC) and components 522-*a* may be implemented as hardware elements of the ASIC.

According to some examples, apparatus 500 may include a receive component 522-1. Receive component 522-1 may be executed by circuitry 520 to receive configuration information for configuring a WLAN for a subscriber as a connection point for a social network including one or more roaming members. Receive component 522-1 may also receive roaming member information to identify the one or more roaming members and may receive one or more policies for the one or more roaming members to connect to the WLAN. For these examples, this configuration information may be received in configuration information 505 that may include a friendly name for the WLAN and an identifier for one or more access points for connection to the WLAN. The roaming member information may also be received in roaming member information 515 that includes identifier information for each of the roaming members. The policy information may be received via policies 530. Also, in some examples, receive component 522-1 may also receive roaming partner information for the subscriber to use another WLAN as another connection point to the social network. The roaming partner information may be received via roaming partner information 535 that includes a friendly name for the other WLAN and an identifier for one or more access points for connecting to the other WLAN.

In some examples, apparatus 500 may also include an information component 522-2. Information component 522-2 may be executed by circuitry 520 to maintain configuration information, the roaming member information and the one or more policies at the server including apparatus 500 to set up the subscriber's WLAN for the social network. Also, information component 522-2 may also maintain roaming partner information for connecting to the other WLAN. For these examples, this information may be maintained in SMO 523-*a* by information component 522-2. SMO 523-*a* may be data structure such as a subscription management object that may be maintained in a memory at and/or accessible to server and information component 522-2.

According to some examples, apparatus 500 may also include an access component 522-3. Access component 522-3 may be executed by circuitry 520 to grant a request from the subscriber for a UE belonging to a given roaming member to connect to the WLAN based on the given roaming member identified as being among the one or more roaming members included in the social network. For these examples, connection request 540 may be received from the UE and a grant request 545 may be granted if the information maintained at SMO 523-a indicates the UE is a roaming member of the social network.

In some examples, access component 522-3 may also grant a connection request for the subscriber to connect to the other WLAN based on the roaming partner information maintained at SMO 523-a and based on a subscriber agreement related to the subscriber. For these examples, the subscriber agreement may also be maintained with SMO 523-a and may indicate possible restrictions related to the subscriber connecting to WLANs. These restriction may indicate one or more of a number of WLANs the subscriber may be allowed to connect, a geographic boundary from which the subscriber may connect to a WLAN, a connection count threshold for separate connections to WLANs included in the social network or a given security level threshold associated with WLANs via which the subscriber may use as a connection point for the social network.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
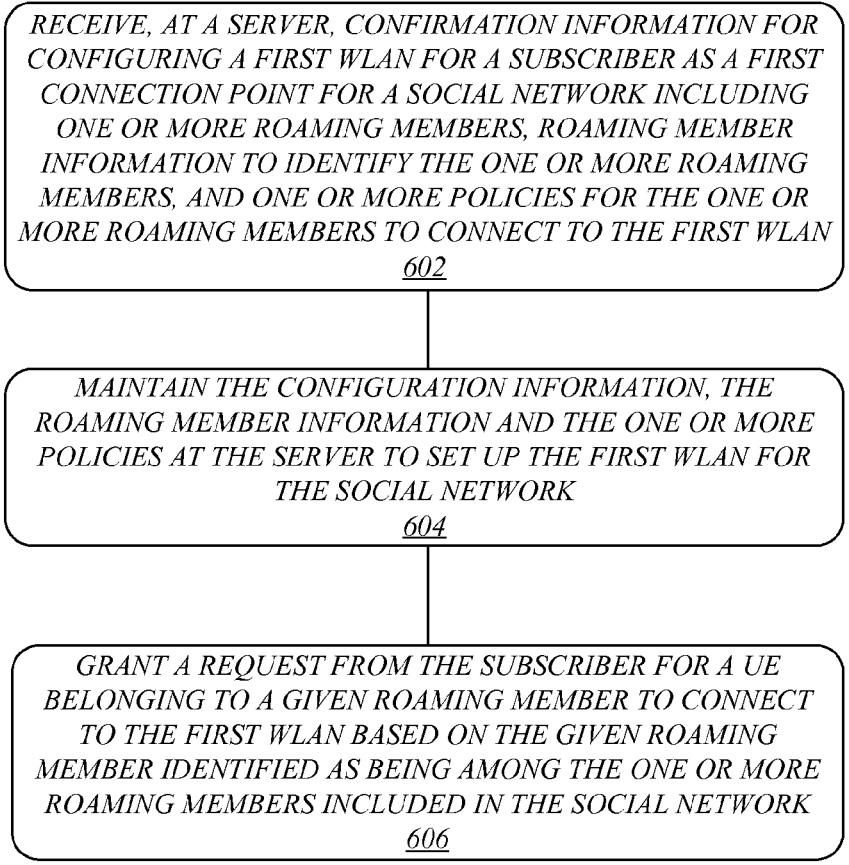
FIG. 6 illustrates an example of a first logic flow.

FIG. 6 illustrates an example of a first logic flow. As shown in FIG. 6, the first logic flow includes a logic flow 600. Logic flow 600 may be representative of some or all of the operations executed by one or more logic, features, or devices described herein, such as apparatus 500. More particularly, logic flow 600 may be implemented by receive component 522-1, information component 522-2 or access component 522-3.

In the illustrated example shown in FIG. 6, logic flow 600 at block 602 may receive, at a server, confirmation information for configuring a first WLAN for a subscriber as a first connection point for a social network including one or more roaming members, roaming member information to identify the one or more roaming members and one or more policies for the one or more roaming members to connect to the first WLAN. For these examples, receive component 522-1 may receive this information via configuration information 505, roaming member information 515 and policies 530 for the subscriber or from a UE being operated by the subscriber.

According to some examples, logic flow 600 at block 604 may maintain the configuration information, the roaming member information and the one or more policies at the server to set up the first WLAN for the social network. For these examples, information component 522-2 may maintained the information in SMO 523-a. The information maintained in SMO 523-a may be in a format similar to subscription management object 400 described for FIG. 4.

According to some examples, logic flow 600 at block 606 may grant a request from the subscriber for a UE belonging to a given roaming member to connect to the first WLAN based on the given roaming member identified as being among the one or more roaming members included in the social network. For these examples, access component 522-3 may receive the request via connection request 540 and may provide a grant via connection grant 545 if the given roaming member is among the one or more roaming members.

FIG. 7 illustrates an embodiment of a first storage medium. As shown in FIG. 7, the first storage medium includes a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
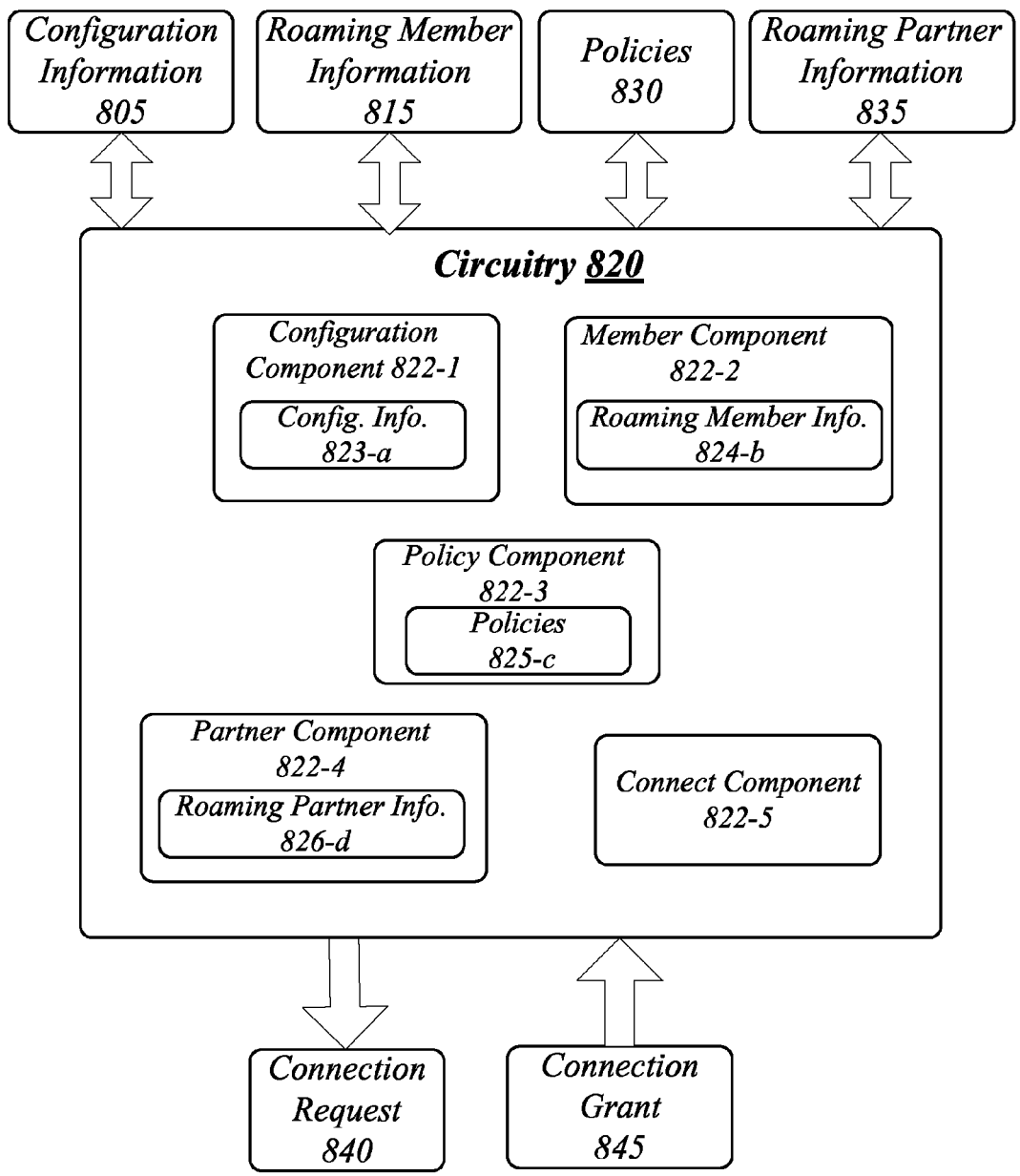
FIG. 8 illustrates an example block diagram for a second apparatus.

FIG. 8 illustrates a block diagram for a second apparatus. As shown in FIG. 8, the second apparatus includes an apparatus 800. Although apparatus 800 shown in FIG. 8 has a limited number of elements in a certain topology or configuration, it may be appreciated that apparatus 800 may include more or less elements in alternate configurations as desired for a given implementation.

The apparatus 800 may comprise a computer-implemented apparatus 800 having circuitry 820 arranged to execute one or more components 822-a. Similar to apparatus 500 for FIG. 5, "a" and "b" and "c" and similar designators may be variables representing any positive integer.

According to some examples, apparatus 500 may be part of a mobile device or UE that may be capable of operating in compliance with one or more wireless technologies such as those described in or associated with the IEEE 802.11 standards. For example, the server having apparatus 800 may be arranged or configured to wirelessly couple to a UE and/or an wirelessly couple to an access point for a WLAN operated in compliance with IEEE 802.11 standards including IEEE 802.11u and/or specifications such as WFA Hotspot 2.0. The examples are not limited in this context.

In some examples, as shown in FIG. 8, apparatus 800 includes circuitry 820. Circuitry 820 may be generally arranged to execute one or more components 822-a. The circuitry 820 can be any of various commercially available processors to include, but not limited to, those previously mentioned for circuitry 520 for apparatus 500. Dual microprocessors, multi-core processors, and other multi-processor architectures may also be employed as circuitry 820. According to some examples circuitry 820 may also be an application specific integrated circuit (ASIC) and components 822-*a* may be implemented as hardware elements of the ASIC.

According to some examples, apparatus 800 may include a configuration component 822-1. Configuration component 822-1 may be executed by circuitry 820 to receive configuration information to configure a WLAN as a connection point for a social network including one or more roaming members. For these examples, the configuration information may include a friendly name for the WLAN and an identifier for one or more access points for the UE including apparatus 800 to connect to the WLAN. The configuration information may be received via configuration information 805 and may be at least temporarily maintained in config. info. 823-*a*. Config. info. 823-*a* may be maintained by configuration component 822-1 in a data structure such as a lookup table (LUT).

In some examples, apparatus 800 may also include a member component 822-2. Member component 822-2 may be executed by circuitry 820 to receive roaming member information to identify the one or more roaming members included in the social network. For these examples, member component 822-2 may receive the roaming member information via roaming member information 815. Also, in some examples, member component 822-2 may cause the roaming member information to be sent to a service provider for the UE. The roaming member information may be at least temporarily maintained in roaming member info. 824-*b* by member component 822-2. Roaming member info. 824-*b* may be maintained by member component 822-2 in a data structure such a LUT.

In some examples, apparatus 800 may also include a policy component 822-3. Policy component 822-3 may be executed by circuitry 820 to receive indications of one or more policies for the one or more roaming members to connect to the WLAN. For these examples, policy component 822-3 may cause the one or more policies and the configuration information to be sent to the service provider to setup the WLAN for the social network. The roaming member information and one or more policies may be sent via roaming member information 815 and policies 830, respectively to setup the WLAN. Also, the one or more policies may be at least temporarily maintained by policy component 822-3 in policies 825-*c*. Policies 825-*c* may be maintained by policy component 822-3 in a data structure such as a LUT.

According to some examples, apparatus 800 may also include a partner component 822-4. Partner component 822-4 may be executed by circuitry 820 to receive roaming partner information for the UE including apparatus 800 to connect to another WLAN for the social network. For these examples, the roaming partner information may be received via roaming information 835 and may include a friendly name for the other WLAN. The roaming partner information may also include an identifier for one or more access points for connecting to the other WLAN. Also, in some examples, the roaming partner may cause the roaming partner information to be sent to the service provide to include the other WLAN as another connection point for the social network. Also, the partner roaming information may be at least temporarily maintained by partner component 822-4 in roaming partner info. 826-*d*. Roaming partner info. 826-*d* may be maintained by partner component 822-4 in a data structure such as a LUT.

In some examples, apparatus 800 may also include a connect component 822-5. Connect component 822-5 may be executed by circuitry 820 to detect one or more access points for the other WLAN. For these examples, connect component 822-5 may then cause a connection request 840 to be sent to the service provider to connect to the other WLAN. Connect component 822-5 may then cause the UE to connect to the other WLAN responsive to receipt of a connection grant 845 from the service provider to connect to the other WLAN.

According to some examples, connect component 822-5 may cause the UE to connect to the other WLAN responsive to the grant and based one either an auto-connect (no user prompt) or following a connection selection by a user of the UE to a prompt provided to the user for connecting to the other WLAN.

Various components of apparatus 800 and a device implementing apparatus 800 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 9:
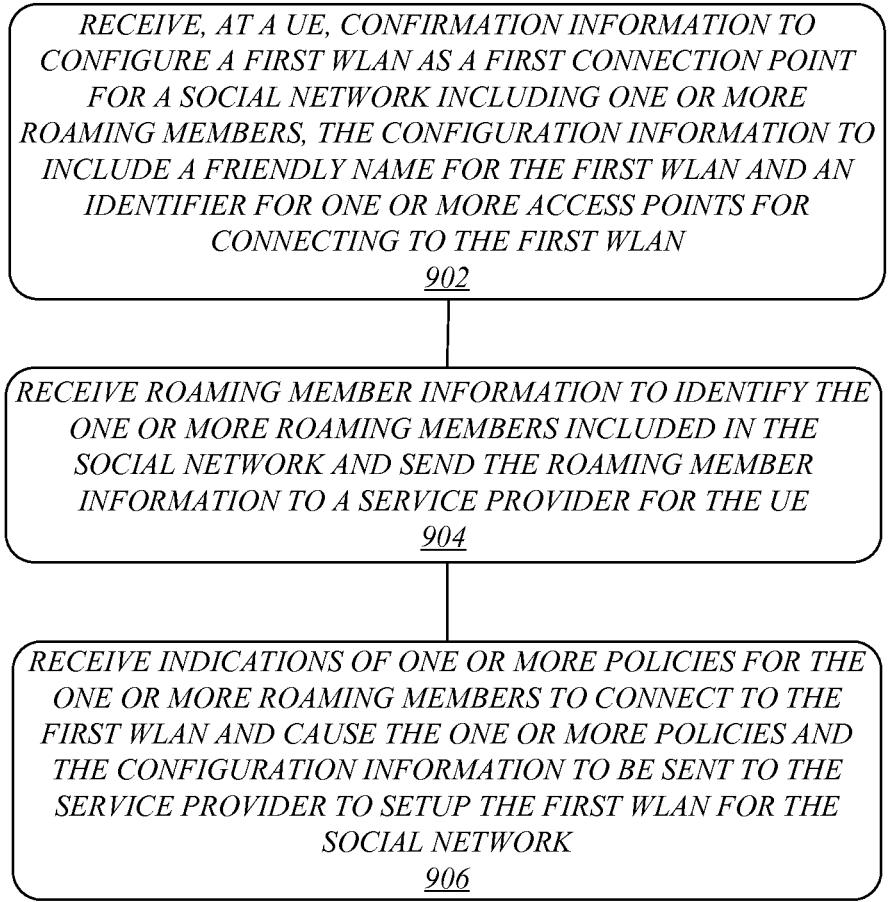
FIG. 9 illustrates an example of a second logic flow.

FIG. 9 illustrates an example of a second logic flow. As shown in FIG. 9, the second logic flow includes a logic flow 900. Logic flow 900 may be representative of some or all of the operations executed by one or more logic, features, or devices described herein, such as apparatus 900. More particularly, logic flow 900 may be implemented by configuration component 822-1, member component 822-2, policy component 822-3, partner component 822-4 or connect component 822-5.

In the illustrated example shown in FIG. 9, logic flow 900 at block 902 may receive, at a UE, confirmation information to configure a first WLAN as a first connection point for a social network including one or more roaming members. In some examples, the configuration information may include a friendly name for the first WLAN and an identifier for the one or more access points for connecting to the first WLAN. For these examples, the configuration information may be received by configuration component 822-1 via configuration information 805, e.g., from a user of the UE that may also be the operator/owner of the first WLAN.

According to some examples, logic flow 900 at block 904 may receive roaming member information to identify the one or more roaming members included in the social network and send the roaming member information to a service provider for the UE. For these examples, member component 822-2 may receive the roaming member information via roaming member information 815, e.g., from one or more lists maintained at or accessible to the UE.

According to some examples, logic flow 900 at block 906 may receive indications of one or more policies for the one or more roaming members to connect to the first WLAN and cause the one or more policies and the configuration information to be sent to the service provider to setup the first WLAN for the social network. For these examples, policy component 822-3 may receive the one or more policies via policies 830, e.g., from the user of the UE. Policy component 822-3 may then cause policies 830 and configuration information 805 to be sent to the service provider to setup the first WLAN for the social network.

FIG. 10 illustrates an embodiment of a first storage medium. As shown in FIG. 10, the first storage medium includes a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
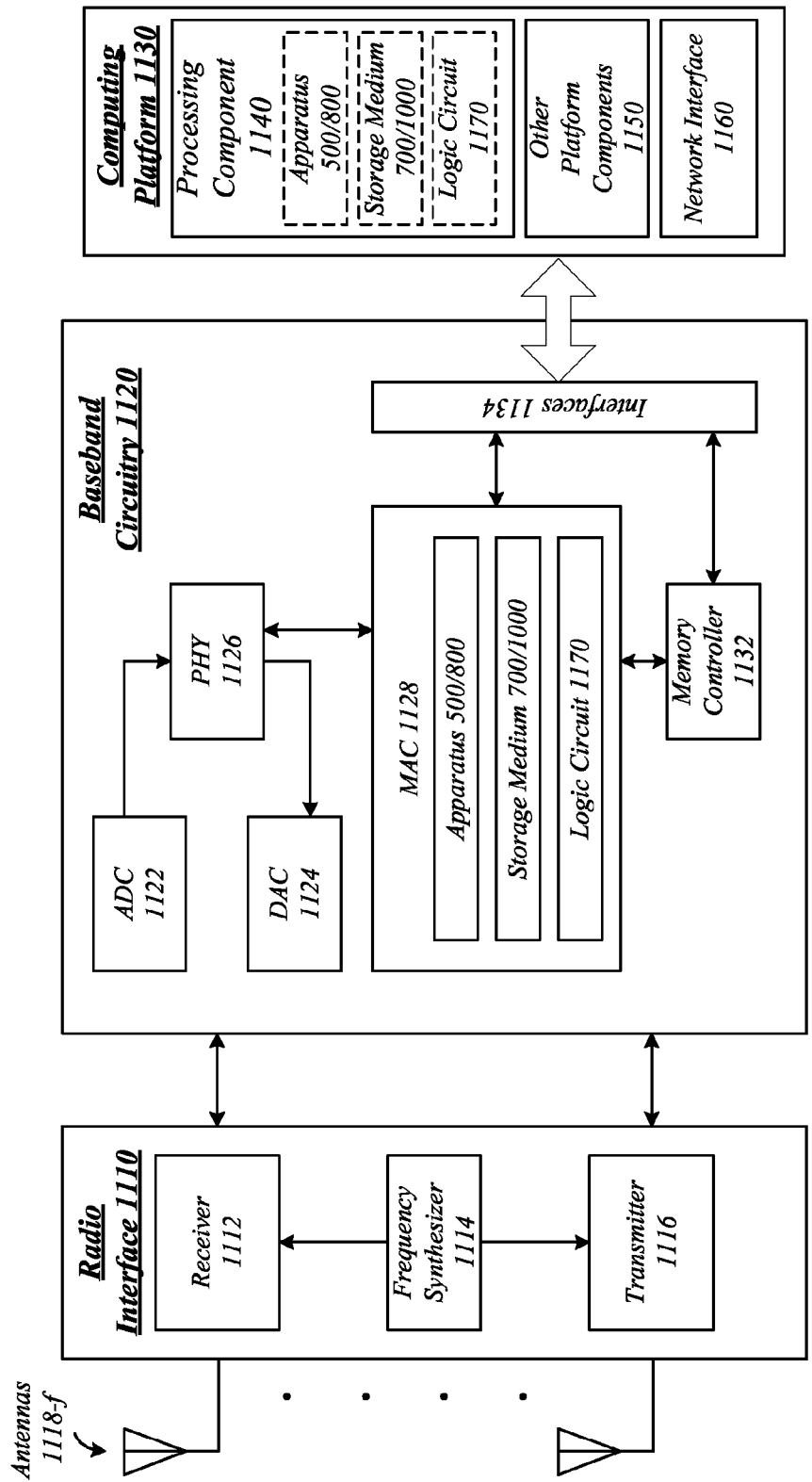
FIG. 11 illustrates an example of a device.

FIG. 11 illustrates an embodiment of a device 1100. In some examples, device 1100 may be configured or arranged for wireless communications in a wireless network. Device 1100 may implement, for example, apparatus 500/800, storage medium 700/1000 and/or a logic circuit 1170. The logic circuit 1170 may include physical circuits to perform operations described for apparatus 500/800. As shown in FIG. 11, device 1100 may include a radio interface 1110, baseband circuitry 1120, and computing platform 1130, although examples are not limited to this configuration.

The device 1100 may implement some or all of the structure and/or operations for apparatus 500/800, storage medium 700/1000 and/or logic circuit 1170 in a single computing entity, such as entirely within a single device. The embodiments are not limited in this context.

radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118-*f*. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with MAC processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames (e.g., containing subframes). Alternatively or in addition, MAC processing circuit 1128 may share processing for certain of these functions or perform these processes independent of PHY processing circuit 1126. In some embodiments, MAC and PHY processing may be integrated into a single circuit.

Computing platform 1130 may provide computing functionality for device 1100. As shown, computing platform 1130 may include a processing component 1140. In addition to, or alternatively of, baseband circuitry 1120 of device 1100 may execute processing operations or logic for apparatus 500/800, storage medium 700/1000, and logic circuit 1170 using the processing component 1130. Processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1130 may further include a network interface 1160. In some examples, network interface 1160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 1100 may be, for example, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated with IEEE 802.11u, WFA Hotspot 2.0 and/or other IEEE 802.11 Standards for WLANs, although the examples are not limited in this respect.

Embodiments of device 1100 may be implemented using single input single output (SISO) architectures. However, certain implementations may include multiple antennas (e.g., antennas 1118-*f*) for transmission and/or reception using adaptive antenna techniques for beamforming or spatial division multiple access (SDMA) and/or using multiple input multiple output (MIMO) communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example first apparatus for a service provider of a WAN may include circuitry. For these examples, the first apparatus may also include a receive component to be executed by the circuitry to receive configuration information to configure a first WLAN for a subscriber as a first connection point for a social network including one or more roaming members. The receive component may also receive roaming member information to identify the one or more roaming members and may receive one or more policies for the one or more roaming members to connect to the first WLAN. The first apparatus may also include an information component to be executed by the circuitry to maintain the configuration information, the roaming member information and the one or more policies at the server to set up the first WLAN for the social network. The first apparatus may also include an access component to be executed by the circuitry to grant a request from the subscriber for user equipment (UE) belonging to a given roaming member to connect to the first WLAN based on the given roaming member identified as being among the one or more roaming members included in the social network.

According to some examples for the example first apparatus, the configuration information may include a friendly name for the first WLAN and an identifier for one or more access points for connecting to the first WLAN.

In some examples for the example first apparatus, the first WLAN may be capable of operating in compliance with at least one or more wireless communication standards or specifications associated with the IEEE 802.11 standards to include IEEE 802.11u or associated with the Hotspot 2.0 Technical Specification.

According to some examples, the configuration information, the roaming member information and the one or more policies may be maintained by the service provider as a subscription management object related to a subscriber agreement for the subscriber to connect to the WAN.

In to some examples for the example first apparatus, the identifier for the one or more access points to connect to the first WLAN may include one of a SSID or a HESSID.

According to some examples for the example first apparatus, the one or more roaming members may originate from one or more lists associated with the subscriber, the one or more lists to include one or more of a contact list, a friend list, a follower list, a customer list, a vendor list, a club list, a family member list, a professional association list, an employee list, a school list.

According to some examples for the example first apparatus, the information component may maintain the configuration information, the roaming member information and the one or more policies at the server in a memory accessible to the server, the memory to include a nonvolatile memory or a volatile memory.

In some examples for the example first apparatus, the receive component may receive roaming partner information for the subscriber to use a second WLAN as a second connection point for the social network. The roaming partner information may include a friendly name for the second WLAN and an identifier for one or more access points for connecting to the second WLAN. For these examples, the information component may maintain the roaming partner information at the server and the access component may grant a connection request for the subscriber to connect to the second WLAN based on the roaming partner information and based on a subscriber agreement related to the subscriber.

According to some examples for the example first apparatus, the subscriber agreement may indicate one or more of a number of WLANs the subscriber can connect, a geographic boundary from which the subscriber may connect to a WLAN, a connection count threshold for separate connections to WLANs included in the social network or a given security level threshold associated with WLANs via which the subscriber may use as a connection point for the social network.

In some examples for the example first apparatus, the one or more policies for the one or more roaming members to connect to the first WLAN may include one or more of the subscriber to allow the one or more roaming members to auto-connect to the first WLAN, the subscriber to allow auto-connect for a first portion of the one or more roaming members and send a prompt to connect to a second portion of the one or more roaming members, the subscriber to be prompted whenever a roaming member from among the one or more roaming members requests to connect to the first WLAN, the subscriber to set a time limit threshold for a roaming member to connect, or the subscriber to be prompted whenever a new roaming member requests to connect to the first WLAN.

In some examples, example first methods implemented at a server for a service provider of a WAN may include receiving, at the server, configuration information for configuring a first WLAN for a subscriber as a first connection point for a social network including one or more roaming members. Roaming member information to identify the one or more roaming members, and one or more policies for the one or more roaming members to connect to the first WLAN may also be received. The example first methods may also include maintaining the configuration information, the roaming member information and the one or more policies at the server to set up the first WLAN for the social network.

According to some examples for the example first methods, the configuration information may include a friendly name for the first WLAN and an identifier for one or more access points for connecting to the first WLAN.

In some examples for the example first methods, the first WLAN may be capable of operating in compliance with at least one or more wireless communication standards or specifications associated with the IEEE 802.11 standards to include IEEE 802.11u or associated with the Hotspot 2.0 Technical Specification.

According to some examples for the example first methods, the configuration information, the roaming member information and the one or more policies may be maintained by as a subscription management object related to a subscriber agreement for the subscriber to connect to the WAN.

In some examples for the example first methods, the identifier for the one or more access points for connecting to the first WLAN may include one of a SSID or a HESSID.

According to some examples, the example first methods may also include receiving a request from the subscriber for a UE belonging to a given roaming member to connect to the first WLAN and granting the request to connect to the first WLAN based on the given roaming member identified as being among the one or more roaming members included in the social network.

In some examples for the example first methods, the one or more roaming members may originate from one or more lists related to the subscriber, the one or more lists to include one or more of a contact list, a friend list, a follower list, a customer list, a vendor list, a club list, a family member list, a professional association list, an employee list, a school list.

According to some examples for the example first methods, the configuration information, the roaming member information and the one or more policies may be maintained at the server in a memory accessible to the server.

In some examples for the example first methods, the one or more policies may include one or more of allowing the one or more roaming members to auto-connect to the first WLAN, allowing auto-connect for a first portion of the one or more roaming members and send a prompt to connect to a second portion of the one or more roaming members, prompting the subscriber whenever a roaming member from among the one or more roaming members requests to connect to the first WLAN, setting a time limit threshold for a roaming member to connect, or prompting the subscriber whenever a new roaming member requests to connect to the first WLAN.

According to some examples, the example first methods may also include receiving roaming partner information for the subscriber to use a second WLAN as a second connection point for the social network. For these examples, the roaming partner information may include a friendly name for the second WLAN and an identifier for one or more access points for connecting to the second WLAN. The example first methods may also include maintaining the roaming partner information at the server. The example first methods may also include receiving a request for the subscriber to connect to the second WLAN and sending a grant to the subscriber to connect to the second WLAN based on the roaming partner information and based on a subscriber agreement related to the subscriber.

In some examples for the example first methods, the subscriber agreement may indicate one or more of a number of WLANs the subscriber can connect, a geographic boundary from which the subscriber may connect to a WLAN, a connection count threshold for separate connections to WLANs included in the social network or a given security level threshold associated with WLANs via which the subscriber may use as a connection point for the social network.

In some examples, at least one machine readable medium comprising a plurality of instructions that in response to being executed on a system at a server for a service provider of a WAN may cause the system to receive, at the server, configuration information for configuring a first WLAN for a subscriber as a first connection point for a social network including one or more roaming members, roaming member information to identify the one or more roaming members, and one or more policies for the one or more roaming members to connect to the first WLAN. The instructions may also cause the system to maintain the configuration information, the roaming member information and the one or more policies at the server to set up the first WLAN for the social network. The instructions may also cause the system to receive a request from the subscriber for user equipment (UE) belonging to a given roaming member to connect to the first WLAN. The instructions may also cause the system to grant the request to connect to the first WLAN based on the given roaming member identified as being among the one or more roaming members included in the social network.

According to some examples for the at least one machine readable medium, the configuration information may include a friendly name for the first WLAN and an identifier for one or more access points for connecting to the first WLAN.

In some examples for the at least one machine readable medium, the first WLAN may be capable of operating in compliance with at least one or more wireless communication standards or specifications associated with the IEEE 802.11 standards to include IEEE 802.11u or associated with the Hotspot 2.0 Technical Specification.

According to some examples for the at least one machine readable medium, the configuration information, the roaming member information and the one or more policies may be maintained as a subscription management object related to subscriber agreement for the subscriber to connect to the WAN.

In some examples for the at least one machine readable medium, the identifier for the one or more access points for connecting to the first WLAN may include one of a SSID or a HESSID.

According to some examples, the instructions may also cause the system to receive roaming partner information for the subscriber to use a second WLAN as a second connection point for the social network, the roaming partner information to include a friendly name for the second WLAN and an identifier for one or more access points for connecting to the second WLAN. The instructions may also cause the system to maintain the roaming partner information at the server. The instructions may also cause the system to receive a request for the subscriber to connect to the second WLAN and send a grant to the subscriber to connect to the second WLAN based on the roaming partner information and based on a subscriber agreement related to the subscriber.

In some examples, an example second apparatus for a UE may include circuitry. The example second apparatus may also include a configuration component to be executed by the circuitry to receive configuration information to configure a first WLAN as a first connection point for a social network including one or more roaming members. The configuration information may include a friendly name for the first WLAN and an identifier for one or more access points for connecting to the first WLAN. The example second apparatus may also include a member component to be executed by the circuitry to receive roaming member information to identify the one or more roaming members included in the social network and cause the roaming member information to be sent to a service provider for the UE. The example second apparatus may also include a policy component to be executed by the circuitry to receive indications of one or more policies for the one or more roaming members to connect to the first WLAN and send the one or more policies and the configuration information to the service provider to setup the first WLAN for the social network.

According to some examples for the example second apparatus, the configuration information to include a friendly name for the first WLAN and an identifier for one or more access points for connecting to the first WLAN.

In some examples for the example second apparatus, the UE and the first WLAN may be capable of operating in compliance with at least one or more wireless communication standards or specifications associated with the IEEE 802.11 standards to include IEEE 802.11u or associated with the Hotspot 2.0 Technical Specification.

According to some examples for the example second apparatus, the configuration information, the roaming member information and the one or more policies may be maintained by the service provider as a subscription management object related to the subscriber agreement.

In some examples for the example second apparatus, the identifier for the one or more access points for connecting to the first WLAN may include one of a SSID or a HESSID.

According to some examples, the example second apparatus may also include a partner component to be executed by the circuitry to receive roaming partner information for the UE to connect to a second WLAN for the social network. For these examples, the roaming partner information may include a friendly name for the second WLAN and an identifier for one or more access points for connecting to the second WLAN. The partner component may cause the roaming partner information to be sent to the service provider to include the second WLAN as a second connection point for the social network. The example second apparatus may also include a connect component to be executed by the circuitry to detect one or more access points for the second WLAN, cause a request to be sent to the service provider to connect to the second WLAN and cause the UE to connect to the second WLAN responsive to receipt of a grant from the service provider that grants the connection request to the second WLAN.

In some examples for the example second apparatus, the connect component to cause the UE to connect to the second WLAN responsive to receipt of the grant based on one of an auto-connect or following a connection selection by a user of the UE to a prompt provided to the user for connecting to the second WLAN.

According to some examples for the example second apparatus, the one or more policies may include one or more of the policy component to allow the one or more roaming members to auto-connect to the first WLAN, the policy component to allow auto-connect for a first portion of the one or more roaming members and cause a prompt to be sent to a second portion of the one or more roaming members to invite the second portion to connect, the policy component to cause a prompt to be presented to a user of the UE whenever a roaming member from among the one or more roaming members requests to connect to the first WLAN, the policy component to set a time limit threshold for a roaming member to connect, or the policy component to cause a prompt to be presented to the user whenever a new roaming member requests to connect to the first WLAN.

In some examples for the example second apparatus, the roaming member information may be received by the partner component from one or more lists related to a user of the UE to include a contact list, a friend list, a follower list, a customer list, a vendor list, a club list, a family member list, a professional association list, an employee list or a school list.

According to some examples for the example second apparatus, the roaming member information may be received by the partner component responsive to a request from another UE to be included as a roaming member in the social network.

In some examples, example second methods implemented at a UE may include receiving, at the UE, configuration information to configure a first WLAN as a first connection point for a social network including one or more roaming members. For these examples, the configuration information may include a friendly name for the first WLAN and an identifier for one or more access points for connecting to the first WLAN. The example second methods may also include sending the configuration information to a service provider of a WAN via which the UE is capable of connecting to according to a subscriber agreement. The example second methods may also include receiving roaming member information to identify the one or more roaming members included in the social network and sending the roaming member information to the service provider. The example second methods may also include receiving indications of one or more policies for the one or more roaming members to connect to the first WLAN and sending the one or more policies and the configuration information to the service provider to setup the first WLAN for the social network.

According to some examples, the example second methods may also include receiving roaming member information from one or more of a contact list, a friend list, a follower list, a customer list, a vendor list, a club list, a family member list, a professional association list, an employee list, a school list or responsive to a request from another UE to be included as a roaming member in the social network.

In some examples, the example second methods may also include receiving roaming partner information for the UE to connect to a second WLAN for the social network, the roaming partner information to include a friendly name for the second WLAN an identifier for one or more access points for connecting to the second WLAN. The example second methods may also include sending the roaming partner information to the service provider to include the second WLAN as a second connection point for the social network. The example second methods may also include detecting one or more access points for the second WLAN and sending a request to the service provider to connect to the second WLAN and connecting to the second WLAN responsive to receiving a grant from the service provider.

According to some examples for the example second methods, the UE may connect to the second WLAN responsive to receiving the grant based on one of an auto-connect or following selection by a user of the UE in response to a prompt provided to the user for connecting to the second WLAN.

In some examples for the example second methods, the one or more policies may include one or more of allowing the one or more roaming members to auto-connect to the first WLAN, allowing auto-connect for a first portion of the one or more roaming members and send a prompt to connect to a second portion of the one or more roaming members, prompting a user of the UE whenever a roaming member from among the one or more roaming members requests to connect to the first WLAN, setting a time limit threshold for a roaming member to connect or prompting the user whenever a new roaming member requests to connect to the first WLAN.

According to some examples for the example second methods, the first portion of the one or more roaming members may include roaming members included in one of a contact list, a friend list, a follower list, a customer list, a vendor list, a club list, a family member list, a professional association list, an employee list or a school list.

In some examples for the example second methods, the UE and the first WLAN may be capable of operating in compliance with at least one or more wireless communication standards or specifications associated with the IEEE 802.11 standards to include IEEE 802.11u or associated with the Hotspot 2.0 Technical Specification.

According to some examples for the example second methods, the configuration information, the roaming member information and the one or more policies may be maintained by the service provider as a subscription management object associated with the subscriber agreement.

In some examples for the example second methods, the identifier for the one or more access points for connecting to the first WLAN to include one of a SSID or a HESSID.

In some examples, a second at least one machine readable medium may include a plurality of instructions that in response to being executed on a system for a UE may cause the system to receive, at the UE, configuration information to configure a first WLAN as a first connection point for a social network including one or more roaming members. The configuration information may include a friendly name for the first WLAN and an identifier for one or more access points for connecting to the first WLAN. The plurality of instructions may also cause the system to send the configuration information to a service provider of a WAN via which the UE is capable of connecting to according to a subscriber agreement. The plurality of instructions may also cause the system to receive roaming member information to identify the one or more roaming members included in the social network and send the roaming member information to the service provider. The plurality of instructions may also cause the system to receive indications of one or more policies for the one or more roaming members to connect to the first WLAN and send the one or more policies and the configuration information to the service provider to setup the first WLAN for the social network.

According to some examples for the second at least one machine readable medium, the instructions may also cause the system to receive roaming partner information for the UE to connect to a second WLAN for the social network. The roaming partner information may include a friendly name for the second WLAN an identifier for one or more access points for connecting to the second WLAN. The instructions may also cause the system to send the roaming partner information to the service provider to include the second WLAN as a second connection point for the social network. The instructions may also cause the system to detect one or more access points for the second WLAN and send a request to the service provider to connect to the second WLAN. The instructions may also cause the system to connect to the second WLAN responsive to receiving a grant from the service provider.

In some examples for the second at least one machine readable medium, the one or more policies may include one or more of allowing the one or more roaming members to auto-connect to the first WLAN, allowing auto-connect for a first portion of the one or more roaming members and send a prompt to connect to a second portion of the one or more roaming members, prompting a user of the UE whenever a roaming member from among the one or more roaming members requests to connect to the first WLAN, setting a time limit threshold for a roaming member to connect, or prompting the user whenever a new roaming member requests to connect to the first WLAN.

According to some examples for the second at least one machine readable medium, the UE and the first WLAN may be capable of operating in compliance with at least one or more wireless communication standards or specifications associated with the IEEE 802.11 standards to include IEEE 802.11u or associated with the Hotspot 2.0 Technical Specification.

In some examples for the second at least one machine readable medium, the configuration information, the roaming member information and the one or more policies may be maintained by the service provider as a subscription management object related to the subscriber agreement.

According some examples for the second at least one machine readable medium, the identifier for the one or more access points for connecting to the first WLAN may include one of a SSID or a HESSID.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. An apparatus comprising:
    circuitry;
    a receive component to be executed by the circuitry to receive configuration information to configure a first wireless local area network (WLAN) for a subscriber as a first connection point for a social network including a plurality of roaming members, roaming member information to identify the plurality of roaming members, and one or more policies for the plurality of roaming members to connect to the first WLAN, the one or more policies comprising at least allowing auto-connect for a first portion of the plurality of roaming members and sending a prompt to connect to a second portion of the plurality of roaming members;
    an information component to be executed by the circuitry to maintain the configuration information, the roaming member information and the one or more policies at a server to set up the first WLAN for the social network; and
    an access component to be executed by the circuitry to grant a request from the subscriber for user equipment (UE) belonging to a given roaming member to connect to the first WLAN based on the given roaming member identified as being among the plurality of roaming members included in the social network.

2. The apparatus of claim 1, the configuration information to include a friendly name for the first WLAN and an identifier for each of one or more access points for connecting to the first WLAN.

3. The apparatus of claim 2, comprising the first WLAN capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification.

4. The apparatus of claim 3, comprising the configuration information, the roaming member information and the one or more policies maintained by a service provider as a subscription management object related to a subscriber agreement for the subscriber to connect to a wide area network, (WAN).

5. The apparatus of claim 3, the identifier for the one or more access points to connect to the first WLAN to include one of a service set identification (SSID) or a homogenous extended service set identification (HESSID).

6. The apparatus of claim 1, comprising:
    the receive component to receive roaming partner information for the subscriber to use a second WLAN as a second connection point for the social network, the roaming partner information to include a friendly name for the second WLAN and an identifier for each of one or more access points for connecting to the second WLAN;
    the information component to maintain the roaming partner information at the server;
    the access component to grant a connection request for the subscriber to connect to the second WLAN based on the roaming partner information and based on a subscriber agreement related to the subscriber.

7. The apparatus of claim 1, the first portion of the plurality of roaming members on a list related to the subscriber and the second portion of the plurality of roaming members not on the list related to the subscriber.

8. A method comprising:
    receiving, at a server, configuration information for configuring a first wireless local area network (WLAN) for a subscriber as a first connection point for a social network including a plurality of roaming members, roaming member information to identify the plurality of roaming members, and one or more policies for the plurality of roaming members to connect to the first WLAN, the one or more policies comprising at least allowing auto-connect for a first portion of the plurality of roaming members and send a prompt to connect to a second portion of the plurality of roaming members; and
    maintaining the configuration information, the roaming member information and the one or more policies at the server to set up the first WLAN for the social network.

9. The method of claim 8, the configuration information to include a friendly name for the first WLAN and an identifier for each of one or more access points for connecting to the first WLAN.

10. The method of claim 9, comprising the first WLAN capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification.

11. The method of claim 10, comprising the configuration information, the roaming member information and the one or more policies maintained as a subscription management object related to a subscriber agreement for the subscriber to connect to a wide area network (WAN).

12. The method of claim 10, the identifier for the one or more access points for connecting to the first WLAN to include one of a service set identification (SSID) or a homogenous extended service set identification (HESSID).

13. The method of claim 8, comprising:
    receiving a request from the subscriber for user equipment (UE) belonging to a given roaming member to connect to the first WLAN; and
    granting the request to connect to the first WLAN based on the given roaming member identified as being among the plurality of roaming members included in the social network.

14. The method of claim 8, comprising the plurality of roaming members originating from one or more lists related to the subscriber, the one or more lists to include one or more of a contact list, a friend list, a follower list, a customer list, a vendor list, a club list, a family member list, a professional association list, an employee list, a school list.

15. The method of claim 8, comprising maintaining the configuration information, the roaming member information and the one or more policies at the server in a memory accessible to the server.

16. The method of claim 8, the one or more policies comprising one or more of prompting the subscriber whenever a roaming member from among the plurality of roaming members requests to connect to the first WLAN, setting a time limit threshold for a roaming member to connect, or prompting the subscriber whenever a new roaming member requests to connect to the first WLAN.

17. The method of claim 8, comprising:
receiving roaming partner information for the subscriber to use a second WLAN as a second connection point for the social network, the roaming partner information to include a friendly name for the second WLAN and an identifier for each of one or more access points for connecting to the second WLAN;
maintaining the roaming partner information at the server;
receiving a request for the subscriber to connect to the second WLAN; and
sending a grant to the subscriber to connect to the second WLAN based on the roaming partner information and based on a subscriber agreement related to the subscriber.

18. The method of claim 17, comprising the subscriber agreement to indicate one or more of a number of WLANs to which the subscriber can connect, a geographic boundary from which the subscriber may connect to a WLAN, a connection count threshold for separate connections to WLANs included in the social network or a given security level threshold associated with WLANs which the subscriber may use as a connection point for the social network.

19. At least one non-transitory machine readable medium comprising a plurality of instructions that in response to being executed on a system at a server for a service provider of a wide area network (WAN) cause the system to:
receive, at the server, configuration information for configuring a first wireless local area network (WLAN) for a subscriber as a first connection point for a social network including a plurality of roaming members, roaming member information to identify the plurality of roaming members, and one or more policies for the plurality of roaming members to connect to the first WLAN the one or more policies comprising at least allowing auto-connect for a first portion of the plurality of roaming members and send a prompt to connect to a second portion of the plurality of roaming members;
maintain the configuration information, the roaming member information and the one or more policies at the server to set up the first WLAN for the social network; and
receiving a request from the subscriber for user equipment (UE) belonging to a given roaming member to connect to the first WLAN;
grant the request to connect to the first WLAN based on the given roaming member identified as being among the plurality of roaming members included in the social network;
receive roaming partner information for the subscriber to use a second WLAN as a second connection point for the social network, the roaming partner information to include a friendly name for the second WLAN and an identifier for one or more access points for connecting to the second WLAN;
maintain the roaming partner information at the server;
receive a request for the subscriber to connect to the second WLAN; and
send a grant to the subscriber to connect to the second WLAN based on the roaming partner information and based on a subscriber agreement related to the subscriber.

20. The at least one non-transitory machine readable medium of claim 19, the configuration information to include a friendly name for the first WLAN and an identifier for each of one or more access points for connecting to the first WLAN.

21. The at least one non-transitory machine readable medium of claim 20, comprising the first WLAN capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification.

22. An apparatus comprising:
circuitry;
a configuration component to be executed by the circuitry to receive configuration information to configure a first wireless local area network (WLAN) as a first connection point for a social network including a plurality of roaming members, the configuration information to include a friendly name for the first WLAN and an identifier for each of one or more access points for connecting to the first WLAN;
a member component to be executed by the circuitry to receive roaming member information to identify the plurality of roaming members included in the social network and cause the roaming member information to be sent to a service provider for user equipment (UE);
a policy component to be executed by the circuitry to receive indications of one or more policies for the plurality of roaming members to connect to the first WLAN and cause the one or more policies and the configuration information to be sent to the service provider to setup the first WLAN for the social network, the one or more policies comprising at least allowing auto-connect for a first portion of the plurality of roaming members and sending a prompt to connect to a second portion of the plurality of roaming members;
a partner component to be executed by the circuitry to receive roaming partner information for the UE to connect to a second WLAN for the social network, the roaming partner information to include a friendly name for the second WLAN and an identifier for each of one or more access points for connecting to the second WLAN, the partner component to cause the roaming partner information to be sent to the service provider to include the second WLAN as a second connection point for the social network; and
a connect component to be executed by the circuitry to detect one or more access points for the second WLAN, cause a request to be sent to the service provider to connect to the second WLAN and cause the UE to connect to the second WLAN responsive to receipt of a grant from the service provider that grants the connection request to the second WLAN.

23. The apparatus of claim 22, the UE and the first WLAN capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification.

24. The apparatus of claim 23, the configuration information, the roaming member information and the one or more policies maintained by the service provider as a subscription management object related to a subscriber agreement.

25. The apparatus of claim 22, comprising the connect component to cause the UE to connect to the second WLAN responsive to receipt of the grant based on one of an auto-connect or following a connection selection by a user of the UE to a prompt provided to the user for connecting to the second WLAN.

26. The apparatus of claim 22, the roaming member information received by the partner component responsive to a request from another UE to be included as a roaming member in the social network.

27. A method comprising:
receiving, at user equipment (UE), configuration information to configure a first wireless local area network (WLAN) as a first connection point for a social network including a plurality of roaming members, the configuration information to include a friendly name for the first WLAN and an identifier for each of one or more access points for connecting to the first WLAN;
sending the configuration information to a service provider of a wide area network (WAN) via which the UE is capable of connecting to according to a subscriber agreement;
receiving roaming member information to identify the plurality of roaming members included in the social network and sending the roaming member information to the service provider; and
receiving indications of one or more policies for the plurality of roaming members to connect to the first WLAN and sending the one or more policies and the configuration information to the service provider to setup the first WLAN for the social network, the one or more policies comprising at least allowing auto-connect for a first portion of the plurality of roaming members and sending a prompt to connect to a second portion of the plurality of roaming members.

28. The method of claim 27, comprising receiving the roaming member information from one or more of a contact list, a friend list, a follower list, a customer list, a vendor list, a club list, a family member list, a professional association list, an employee list, a school list or responsive to a request from another UE to be included as a roaming member in the social network.

29. The method of claim 27 comprising:
receiving roaming partner information for the UE to connect to a second WLAN for the social network, the roaming partner information to include a friendly name for the second WLAN and an identifier for each of one or more access points for connecting to the second WLAN;
sending the roaming partner information to the service provider to include the second WLAN as a second connection point for the social network;
detecting one or more access points for the second WLAN and sending a request to the service provider to connect to the second WLAN; and
connecting to the second WLAN responsive to receiving a grant from the service provider.

30. The method of claim 27, the UE and the first WLAN capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification, the configuration information, the roaming member information and the one or more policies maintained by the service provider as a subscription management object associated with the subscriber agreement and the identifier for the one or more access points for connecting to the first WLAN to include one of a service set identification (SSID) or a homogenous extended service set identification (HESSID).

* * * * *